May 1, 1923.
O. CROSBY
CLIP HOOK
Filed Dec. 27, 1921
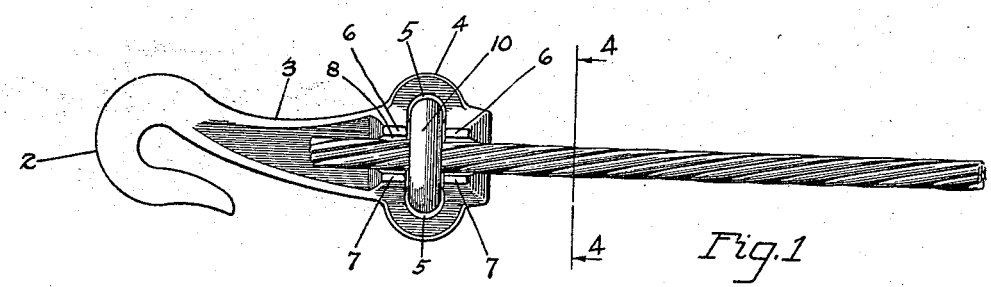
Fig. 1
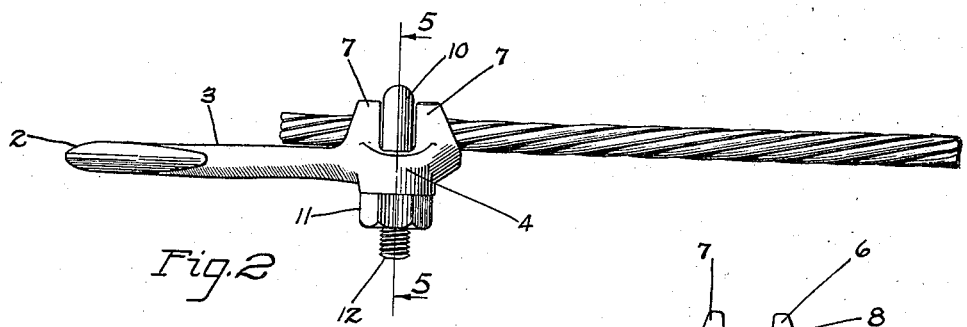
Fig. 2
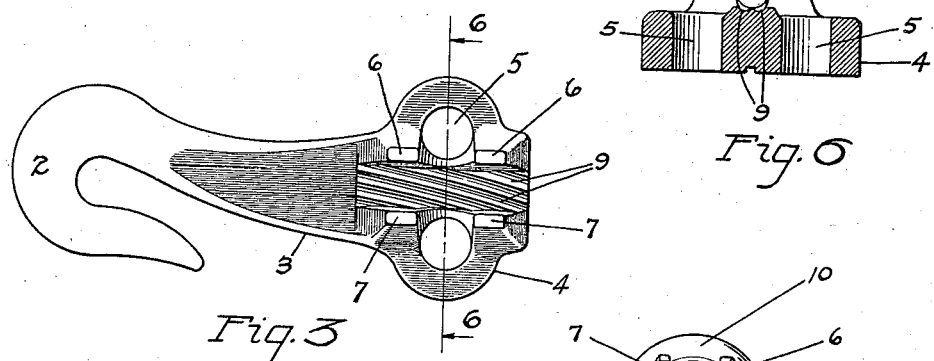
Fig. 3
Fig. 6
Fig. 4
Fig. 5
Inventor
OLIVER CROSBY
By Paul & Paul
ATTORNEYS Patented May 1, 1923.

1,453,706

UNITED STATES PATENT OFFICE.

OLIVER CROSBY, OF ST. PAUL, MINNESOTA.

CLIP HOOK.

Application filed December 27, 1921. Serial No. 525,063.

*To all whom it may concern:*

Be it known that I, OLIVER CROSBY, citizen of the United States, resident of St. Paul, in the county of Ramsey and State of Minnesota, have invented certain new and useful Improvements in Clip Hooks, of which the following is a specification.

This invention relates to improvements in metal clip hooks designed to be connected to wire cables to form a convenient means for connecting said cables to rings or links or other devices.

The invention consists generally in the constructions and combinations hereinafter described, and particularly pointed out in the claims.

In the accompanying drawings:

Figure 1 is a side elevation of a clip hook embodying my invention, the same being shown clamped or connected to a piece of wire cable.

Figure 2 is an elevation of the clip hook and cable shown in Figure 1, the view being taken in a plane at right angles to that of Figure 1.

Figure 3 is a side elevation of the clip hook, separated from the cable with the U-bolt clamping member removed.

Figure 4 is a section on line 4—4 of Figure 1, looking in the direction of the arrows.

Figure 5 is a section on line 5—5 of Figure 2, with the U-bolt member and nuts in elevation.

Figure 6 is a section on line 6—6 of Figure 3, looking in the direction of the arrows.

In the drawings, 2 represents the curved or engaging part of the clip hook, and 3 a substantially flat shank formed integrally therewith. This shank is provided at its ends with a web portion 4 having holes 5 extending through the same. The central part of the shank has formed integrally with it projections 6, 7, forming between them a longitudinally extending cable receiving space or recess 8 the bottom of which is preferably formed as a groove in the body of the shank of the hook. As shown in the drawings the holes 5 are located on opposite sides of the cable receiving groove or recess 8 in the spaces between the projections 6, 7, one hole being located between the projections 6, 6, and the other between the projections 7, 7. This recess preferably extends in the line of the longitudinal center of the hook, and its bottom surface is preferably provided with a series of spirally extending ribs 9 (see Figure 3).

Arranged to straddle the recess 8 between the projections 6, 7, is a U-bolt 10, the legs of which pass through the openings 5 in the web of the hook. As shown particularly in Figure 2 the projections 6, 7, extend upward along both sides of each leg of the U-bolt and form supports therefor when the cable and hook are subjected to a pulling strain. The legs 12 of the U-bolt are threaded and are adapted to pass through said holes 5. Suitable nuts 11 are provided that engage the legs of the U-bolt on the opposite side of the shank of the hook. By inserting the end of a cable in the recess 8 between the projections 6 and 7, and engaging the same with the U-bolt, having its legs extending through the opening 5, with nuts 11, screwed upon the ends of said U-bolt, the portion of the cable lying within the recess or groove 8 may be firmly clamped, by tightening the nuts on the U-bolt, against the bottom of the recess or groove 8. The cable clamped to the hook in the manner described will be firmly bound in the groove of the hook by tightening up the nuts on the legs of the U-bolt thereby securely fastening said hook to said cable. The spiral ribs 9 in the bottom of the groove or recess will aid in holding a spirally wound cable.

With this construction and arrangements of parts no amount of pull will cause the hook to slide upon the cable. The bottom of the cable resting on the spirally grooved surface of the shank of the hook will be pressed against said surface with great pressure by the tightening up of the U-bolt against said cable, and the hook and the cable will be firmly clamped together. By loosening the nuts 11 the U-bolt may be released from the cable and said hook may then be removed from the cable or be shifted back and forth along the cable to any desired position. By tightening the nuts the hook may be firmly secured at any point on the cable.

I claim as my invention:

1. The combination, with a hook having a flattened side and a cable receiving recess on said flattened side extending longitudinally of the shank of the hook whereby a pull on the cable will be transmitted longitudinally of the hook shank, pairs of projections extending outwardly from said flattened side on opposite sides of said recess, said flattened sides having openings extending therethrough on opposite sides of said recess and between said projections, a U-bolt straddling said recess and having threaded legs extending between said projections and through the openings in the hook shank, and nuts engaging the threaded legs of said U-bolt.

2. The combination, with a hook having a flattened side and a cable receiving recess on said flattened side extending longitudinally of the shank of the hook whereby a pull on the cable will be transmitted longitudinally of the hook shank, pairs of projections integral with the hook shank extending outwardly from said shank on opposite sides of said recess, said shank having openings extending therethrough on opposite sides of said recess and between said projections, of a U-bolt straddling said recess to hold a cable extending longitudinally of and parallel with said shank, said bolt having threaded legs extending between said projections and through the openings in the hook shank, and nuts engaging the threaded legs of said U-bolts.

3. The combination, with a hook having a flattened side, and a cable receiving recess on said flattened side, extending longitudinally of the shank of the hook whereby a pull on the cable will be transmitted longitudinally of the hook shank, said recess having a spirally grooved bottom, pairs of projections extending outwardly from said flattened side on opposite sides of said recess, said flattened side having openings extending therethrough on opposite sides of said recess and in line with the spaces between said projections, said projections being integral with said hook, of a U-bolt straddling said recess and having threaded legs extending between said projections and through the openings in the hook shank, and nuts engaging the threaded legs of said U-bolts.

4. A hook comprising a shank portion, a hook portion at one end of the shank portion and holes at the other end of the shank portion, the shank portion having a groove extending longitudinally thereof between said holes to hold a cable parallel with the shank portion, a U-bolt having threaded legs passing through the holes in the end of the shank, and nuts on said legs.

In witness whereof, I have hereunto set my hand this 21st day of December, 1921.

OLIVER CROSBY.